(12) United States Patent  (10) Patent No.: US 8,205,155 B2
Trotter                    (45) Date of Patent:     Jun. 19, 2012

(54) TEXT MANAGEMENT SOFTWARE

(75) Inventor: Paul Stewart Trotter, Auckland (NZ)

(73) Assignee: Author-It Labs Limited, Auckland (NZ)

(*) Notice: Subject to any disclaimer, the term of this patent is extended or adjusted under 35 U.S.C. 154(b) by 296 days.

(21) Appl. No.: 12/529,071

(22) PCT Filed: Feb. 27, 2008

(86) PCT No.: PCT/NZ2008/000033
 § 371 (c)(1),
 (2), (4) Date: Aug. 28, 2009

(87) PCT Pub. No.: WO2008/105674
 PCT Pub. Date: Sep. 4, 2008

(65) Prior Publication Data
 US 2010/0100817 A1    Apr. 22, 2010

(30) Foreign Application Priority Data

Feb. 28, 2007 (NZ) .......................... 553484
Aug. 9, 2007 (NZ) .......................... 560556

(51) Int. Cl.
 G06F 17/00   (2006.01)
(52) U.S. Cl. .................................... 715/261
(58) Field of Classification Search .......... 715/255, 715/256, 260, 261, 264
 See application file for complete search history.

(56) References Cited

U.S. PATENT DOCUMENTS

| 4,504,971 | A | * | 3/1985 | Nadler ........................... 382/177 |
| 5,261,112 | A | * | 11/1993 | Futatsugi et al. ............. 715/246 |
| 5,267,155 | A | | 11/1993 | Buchanan et al. |
| 5,832,531 | A | * | 11/1998 | Ayers .............................. 715/209 |
| 6,065,026 | A | | 5/2000 | Cornelia et al. |
| 6,098,034 | A | * | 8/2000 | Razin et al. ........................ 704/9 |
| 6,473,729 | B1 | | 10/2002 | Gastaldo et al. |
| 6,553,373 | B2 | * | 4/2003 | Boguraev et al. ..................... 1/1 |
| 6,647,396 | B2 | | 11/2003 | Parnell et al. |
| 6,978,419 | B1 | | 12/2005 | Kantrowitz |
| 7,113,943 | B2 | | 9/2006 | Bradford et al. |
| 8,010,518 | B2 | * | 8/2011 | Petri ............................. 707/705 |
| 2004/0021691 | A1 | * | 2/2004 | Dostie et al. .................... 345/773 |
| 2005/0154692 | A1 | * | 7/2005 | Jacobsen et al. ................ 706/47 |
| 2006/0194181 | A1 | * | 8/2006 | Rosenberg ..................... 434/317 |
| 2006/0212441 | A1 | * | 9/2006 | Tang et al. ....................... 707/5 |
| 2006/0271519 | A1 | * | 11/2006 | Blackwood et al. ............. 707/3 |
| 2007/0016571 | A1 | * | 1/2007 | Assadian et al. ................. 707/5 |

FOREIGN PATENT DOCUMENTS

WO   2006/115642   11/2006
* cited by examiner

Primary Examiner — Laurie Ries
(74) Attorney, Agent, or Firm — Young & Thompson

(57) ABSTRACT

Text management software system which stores and retrieves text as paragraph size Text Fragments. Each fragment is stored in a separate record in a text store. As text is created and is to be saved to a text store, the system is adapted to break the text into paragraph size text fragments. As or before text is stored the system runs statistical comparisons between text fragments and builds a matrix of similarity between the text fragments stored in the separate records and presents these to the author for substitution.

13 Claims, 2 Drawing Sheets

TEXT MANAGEMENT SOFTWARE

TECHNICAL FIELD

The invention generally relates to text management software, and more particularly the invention relates to text management software to assist authors and organizations in managing document creation and to find pre-approved text.

BACKGROUND

Re-use of content is the key reason organizations move to content management software such as AuthorIT (developed by the applicant and available from www.authorit.com) or other variations on a text re-use theme.

Most such text re-use applications require a user to plan ahead by choosing known text blocks for incorporation in a new document, and such techniques have the limitation that this requires author research of existing documents or text storage databases. This means that most users will never realize, or even approach, the potential of re-use available from text held in an individuals or organizations storage.

PRIOR ART

Methods of checking documents for similar or the same phrases are known, but many are mainly directed at detecting plagiarism, where entire paragraphs from a known document are duplicated in another document.

In a variation U.S. Pat. No. 6,978,419 relates to detecting near duplicate documents by comparing distinctive text fragments of two documents. It is intended to detect the storage of two identical or near identical documents A variation is used in U.S. Pat. No. 6,473,729 which relates to the translation of text by text fragment comparison and substitution of an equivalent translation of that text fragment.

An example of uses for checking internal consistency are U.S. Pat. No. 5,267,155 which relates to replacing text strings within a document with other text strings or are provided as an internal check on a document to ensure that the same language is used throughout and U.S. Pat. No. 6,098,034 which relates to the retrieval of the nearest matching text phrase from examples using edit distance. This patent specification describes the analysis and extraction of phrases from text as atomic elements and the detection of similar text portions for later use in prompting the user for their replacement.

None of these describe any system of comparing text fragments as they are input, in a manner similar to the well known "predictive text" for single words and none describe a comparison of text fragments from many other documents with text fragments in a document being created to provide a broad base of comparison.

It will be clearly understood that, although prior art publications are referred to herein, these references do not constitute an admission that any of these documents form part of the common general knowledge in the art, in New Zealand or in any other country.

OBJECT

It is an object of this invention to provide text processing methods, apparatus and systems which make re-use of text content easier for authors and preferably more systematic and automatic, or which will at least provide the public with a useful choice.

SUMMARY OF THE INVENTION

In one embodiment the invention consists in a method of substituting alternative text in the electronic input of an authors work wherein text currently being entered by an author is compared to text fragments of previously stored texts and, where the entered text is substantially similar on one of at least two differing bases to previous text fragments displaying to the author substitute text fragments for the entered text and subsequently optionally substituting a chosen text fragment for the entered text.

Preferably the first similarity basis is solely an edit distance basis, and the second distance basis combines a word occurrence algorithm, a word difference algorithm and an edit distance algorithm, and the two bases may contribute differently to the final similarity basis.

Preferably at storage of text fragments any in-line text attributes in a text fragment are separated before determining if a similar text fragment already exists in text storage.

Preferably at storage any "related words" are optionally resolvable to a single normalized word form.

Preferably the text store is a database capable of storing paragraph size text fragments as separate records, each identical text fragment being represented as a single record.

Preferably a single text fragment may have multiple differing equivalents and the document may be recreated in alternative differing forms from the differing equivalents.

Preferably the document may be recreated in a different language.

Preferably differences in in-line tagging can be stored as a separate layer linked to the context of the re-use.

Preferably the system runs statistical comparisons between previously stored text fragments on an edit distance basis and builds a matrix of similarity between the text fragments.

In an alternative embodiment the invention consists in a document authoring system which stores text as text fragments of one or more words, compares text typed into a document with known stored text fragments, and where text typed is similar to known text fragments concurrently displays the known text fragments as alternatives for insertion in the document in place of the text typed, the system additionally further processing typed text to determine further the variations from other stored text and subsequently presenting similar text found as optional substitutes for text fragments of the typed text.

Preferably the stored text fragments contain no text formatting.

Preferably the text fragments are compared initially for word similarity and latterly for similarity on an edit distance basis.

Preferably while text is being typed the text as typed is compared both for similarity with text fragments on a word comparison basis and with similarity on an edit distance basis, and the results of the two comparisons are combined on a percentage basis.

Preferably once a text fragment is complete a further comparison for similarity is made using an edit distance comparison on a normalised form of the text fragment.

In a further embodiment the invention lies in a text substitution apparatus having a store storing text fragments and a viewer presenting text fragments appearing in an electronic document, a comparer comparing presented text fragments with stored text fragments and a choice means offering stored text fragments to an apparatus user where presented text fragments differ from stored text fragments by less than a definable quantity and a substitution means which substitutes a stored text fragment for a presented text fragment when the stored text fragment is chosen by the apparatus user characterized in that the choice means presents stored text fragments in order of similarity to the presented text fragments.

Preferably the definable quantity is defined by the edit distance of the text fragments.

Preferably the definable quantity is presented as a percentage of similarity in terms of edit distance of the presented text fragments to the stored text fragments.

Preferably the definable quantity is presented as a percentage of similarity in terms of relevance of the presented text fragments to the stored text fragments.

Preferably the similarity is indicated by presentation color.

A method of comparing and substituting text at text entry to a document comprising providing a store of text fragments each of one or more words, entering text to the document, concurrently comparing text fragments in the entered text to the stored text fragments, concurrently presenting to the text enterer a list of those stored text fragments closely approximating the entered text fragments for immediate substitution with an entered text fragment, preparing the amended text for storage by resolving each entered text fragment to a normalized form, comparing the normalized text fragments to the stored text fragments and presenting a list of those stored text fragments approximating the normalized text fragments for optional immediate substitution prior to storage.

These and other features of as well as advantages which characterize the present invention will be apparent upon reading of the following detailed description and review of the associated drawings.

DETAILED DESCRIPTION WITH REFERENCE TO THE BLOCKS SHOWN IN FIG. 1

Figure 1:
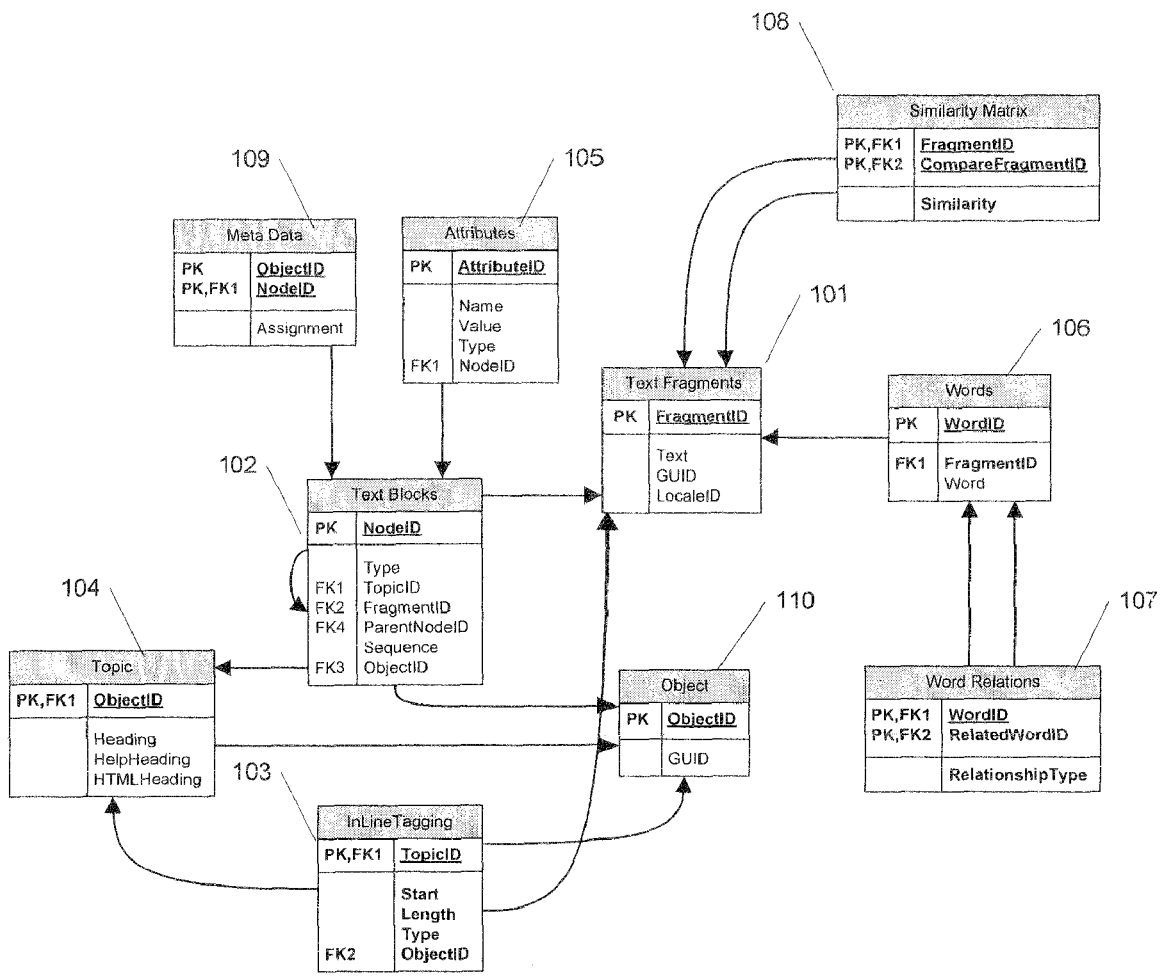
FIG. 1 is an entity relationship diagram of a database consistent with the invention.

FIG. 1 is an Entity Relationship Diagram and illustrates the way content is organized and stored by the text management software system of this invention.

The headings of each block in the drawing correspond to the bold headings in the following detailed description below

DESCRIPTION OF THE INVENTION

Text Fragments

The text fragments stored in table 101 are the actual text of each portion making up a larger text or document. A separate record is created for each and every fragment, which fragment is typically the text of a paragraph, however it may be a smaller entity such as a sentence, phrase or word. Only the raw Unicode text is stored, any external formatting or in-line formatting like hyper linking, bolding or other text attributes, or in-line images being removed and stored separately in InLine Tugging 103

Text Blocks

Text Blocks 102 are made up of Text Fragments 101. A Text Block may contain one or more Text Fragments and the order in which the Text Fragments appear within the Text Block is stored. Each Text Block is of a specific Type, such as a paragraph, a table, a table row, a table cell. In addition each Text Block has an associated Topic. 104

The Text Fragments may appear within a Text Block just as a paragraph, or with table structures. These structures are represented by a node tree with nodes of different types to represent paragraphs, tables, rows, and cells. The nodes also appear in a specific order.

Attributes

Each of the Nodes in the Text Blocks 102, dependent of their Type, can have a set of attributes 105. For example a node of type table would have a table width.

Topic

The Topic 104 is the heading associated with a Text Block 102. It may be held in differing formats for better re-use, e.g. as a text heading or as an HTML formatted heading.

InLine Tagging

In order to maximize re-use, search relevance, and performance the in-line formatting, hyperlink, images, and other inline information is separated and stored as InLine Tagging 103 and related to the Text Fragment 101 and Topic 104. This also means that the same Text Fragment can be used in different contexts with different inline formatting, while still completely re-using the text content.

Typically, in a normal document indexer, this inline information is encoded into the text using tagging. This tagging prevents some forms of searching, in particular phrase searching, from returning relevant results because the tags themselves get in the way. By removing the tags this problem is solved. Removing the inline tagging also improves searching performance by reducing the volume of content required to be searched.

Levenshtein Distance or Edit Distance

Levenshtein distance or edit distance between two strings is given by the minimum number of operations needed to transform one string into the other, where an operation is an insertion, deletion, or substitution of a single character. It is named after Vladimir Levenshtein, who considered this distance in 1965. It is useful in applications that need to determine how similar two strings are, such as spell checkers. While originally a measure of how different words are from each other the edit distance algorithm is also used for phrases.

For instance the edit distance of THEM from THOR is 2 (THEM, THOM, THOR) when considered as characters. In terms of text fragments using the edit distance on a word basis the edit distance of "The quick brown fox jumps over the lazy dog" and "A brown fox quickly jumps over the lazy dog" is also 2.

Similarity Matrix

People often write content that is not exactly the same but very similar to other content already written. In order to help people identify this similarity and reduce duplication and inconsistency, the similarity between any two given Text Fragments is calculated using a variation of the Levenshtein distance algorithm and stored in the Similarity Matrix table 108.

In written language calculating the edit distance at the character level, as is done in the usual Levenshtein algorithm, can create irrelevant results. Words are much more relevant so the same algorithm has been used but relating to words instead of characters. The main difference produced in doing this is that a comparison involves 250,000 words for the English language rather than 128 ASCII characters or 65536 Unicode characters. Word position within a text fragment is potentially less important as an indicator of similarity than the presence of a word, especially since in many languages word order is not particularly important.

As a background or user initiated process, the system runs statistical comparisons between Text Fragments and builds the matrix of similarity between the Text Fragments to help determine where re-use opportunities exist and to allow easy and fast location of similar paragraphs. It is expected that only similarities of about 85% would be useful, however the user should be able to configure the threshold this matrix will store.

Words

Performance is the main technical barrier to implementation of Predictive Re-use Suggestions in a live environment. Searching through the Text Fragments themselves would be far too slow, even on a relatively small corpus.

All languages have a limited set of words, and according to AskOxford.com there are around 250,000 distinct words in the English language and English is most probably the largest language due to its history. It is very unlikely that every single word in any given language will be used by any particular organization so the actual number of words will be substantially less.

Each Text Fragment is therefore indexed and every unique word found is added to the table Words at 106 and referenced back to the Text Fragments 101 it appears in. The words are all converted to lower case, and all punctuation and white space is ignored. Duplicate words within a given fragment are not referenced and word order is not stored.

This means that all searching for Text Fragments based on what a user is typing can be done using words in real time, and is extremely fast. Once the combination of words within the text fragments are found the text fragments themselves can be filtered for similarity to the text typed by the user and presented for inspection.

Word Relations

Language contains many words which have similar meanings or are simply different word forms of each other. For example, jog, run, sprint all have similar meanings, while run, runs, running, ran are all different word forms of the same word. They are referred to here as "related words" or "word relations".

In order to discover Text Fragments that have closer similarities than edit distance alone would show, or to return Text Fragments with words of the same or similar meaning, Word Relations 107 are established between words 106, denoting what the relationship is, eg. synonym, homonym, word form, etc and also how relevant the similarity is. These relationships are then used to improve the relevance of both the Similarity Matrix, and Predictive Re-use Suggestions. The process may also be referred to as normalization, since multiple different variations of a single word or similar different words may be normalized to a single common form. Typically establishing such similarities requires heavy computation and is not currently a suitable function for real time entry unless the processor power available is high, however it can be used as a post-processor function.

Systematic Re-use

At the point at which "topics", or "other objects containing publishable text", are saved the system breaks the content into paragraph size or smaller Text Fragments, separates out any in-line tagging, then determines if an identical paragraph already exists. If so, the existing one is re-used, otherwise a new record is created. Differences in in-line tagging are stored as a separate layer linked to the context of the re-use thus ensuring that changes other than those in the text do not affect a Text Fragment. This provides for systematic re-use.

Metadata

The Metadata table 109 allows users to store their own user defined data against a node in the Text Blocks 101. This data is typically used to tag specific paragraphs or other elements so they can be filtered out during the publishing process.

Predictive Re-use Suggestions

This is perhaps the most difficult function but also the function that provides those most opportunity for creative thought and intelligence. The system may be configured by the user to apply an allocated percentage of two differing search algorithms to determine a final relevance score for a Text Fragment. The allocated percentage of each search algorithm sums to provide a total of 100%. As the user types the system will provide a list of possible suggestions for substitution within the current paragraph for the user to choose from. This list is the result of the percentage score from the similarity of the typed text to a text fragment as held in the Similarity Matrix, and the percentage score from a predictive text search which takes into consideration the Words and/or Word Relations in a Text Fragment, the word relevance based on occurrences in all Text Fragments, the difference in the number of words in the Text Fragments, and a calculation on the Text Fragment using an Edit Distance algorithm. The former relies on quick classification of the typed text fragments with all existing text fragments and is difficult to carry out with current processing power. The second relies on a search of the separate Words of a text fragment being typed to return a list of those Text Fragments which contain all of the words (barring stop words such as "and" and "the") typed in. Such a search may currently be carried out in real time and is the preferred method of returning suggested fragments in a document being actively created, however where processing power is adequate the combined percentage method is preferred.

The interface presents the suggested paragraphs in a list ordered from the most likely down to the least likely suggestion with columns or other indicators as described in Visual Comparison. At the bottom of the list a panel displays the full text of the highlighted item in the list, with extended information.

As the user is typing the system tries to determine this list of suggestions based on the following suggestions:

- once a certain number of keywords are entered, and triggered by completing a word, the system would look for all paragraphs with the same words. If the number of paragraphs found was below a certain threshold (say 5 paragraphs), then the list would be displayed.
- The user is also able to type in a "query" then with a hot-key activate a search. The query supports standard boolean and wildcard functionality. Only a limited number of matches should be returned.
- on content save, or through batch processes, an index of all words, along with number of or percentage of occurrences in paragraphs, and even links to the referenced paragraphs, may be used to eliminate "noise words"—those words that appear in a high percentage of paragraphs—from searches so when the users type the system can determine which words are key. The list may also be used as a fast indexed means of finding paragraphs with those words, avoiding time consuming "like" and full text searches. This may only be necessary if "like" searches prove too slow.
- Suggestions may also be made by looking at other paragraphs in the current topic, and if they are re-used or have very similar matches, then looking at the context of those paragraphs in other topics and suggesting paragraphs next to or close to them for the current text. Further refinement may be achieved by restricting this to topics of the same type as the current one.

Figure 2:
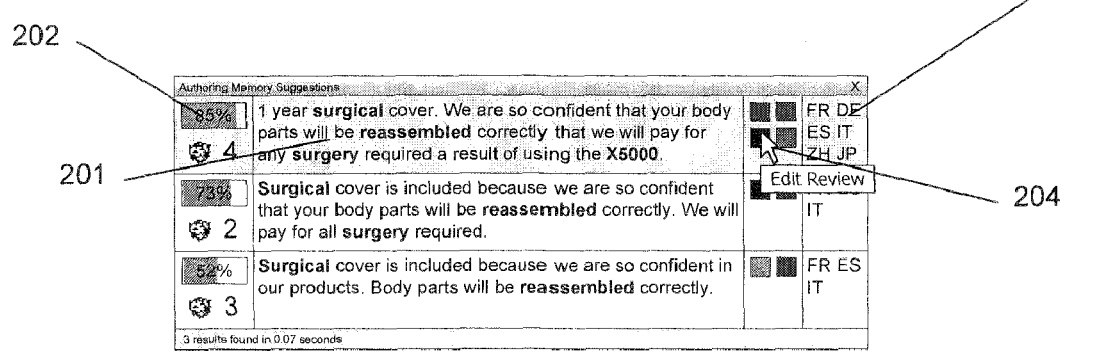
FIG. 2 is a view of a possible text comparison display

FIG. 2 shows one possible version of an interface displaying paragraphs 201 which are similar to words an author is typing. The displayed list of paragraphs displays them in order of similarity (85%, 73%, etc.) at 202 and may indicate which of them exists as an equivalent paragraph in a different language (FR, DE, etc.) at 203 plus an indication of the release status of the paragraph (whether it is an initial version, a later version, a final version) at 204. This allows an author to choose which of the matches found can be chosen to replace the paragraph currently being typed or which is selected.

Parameters for the required similarity of text before it will be displayed as similar may include the number of significant words to be compared, for instance from 3 to 20; whether the comparison is by Edit Distance or a relevance matching; whether the match is to be exact or fuzzy; what highlighting is applied to indicate text re-use, for instance similar words within a text fragment could be bolded. One method of calculating relevance is to count the number of text fragments which a particular word appears in. The relevance of any particular word is the value 1—(Appearances/Total Fragments), a value between 0 and 1. The total relevance of a particular fragment is the sum of relevance for all words found in that fragment.

Figure 3:
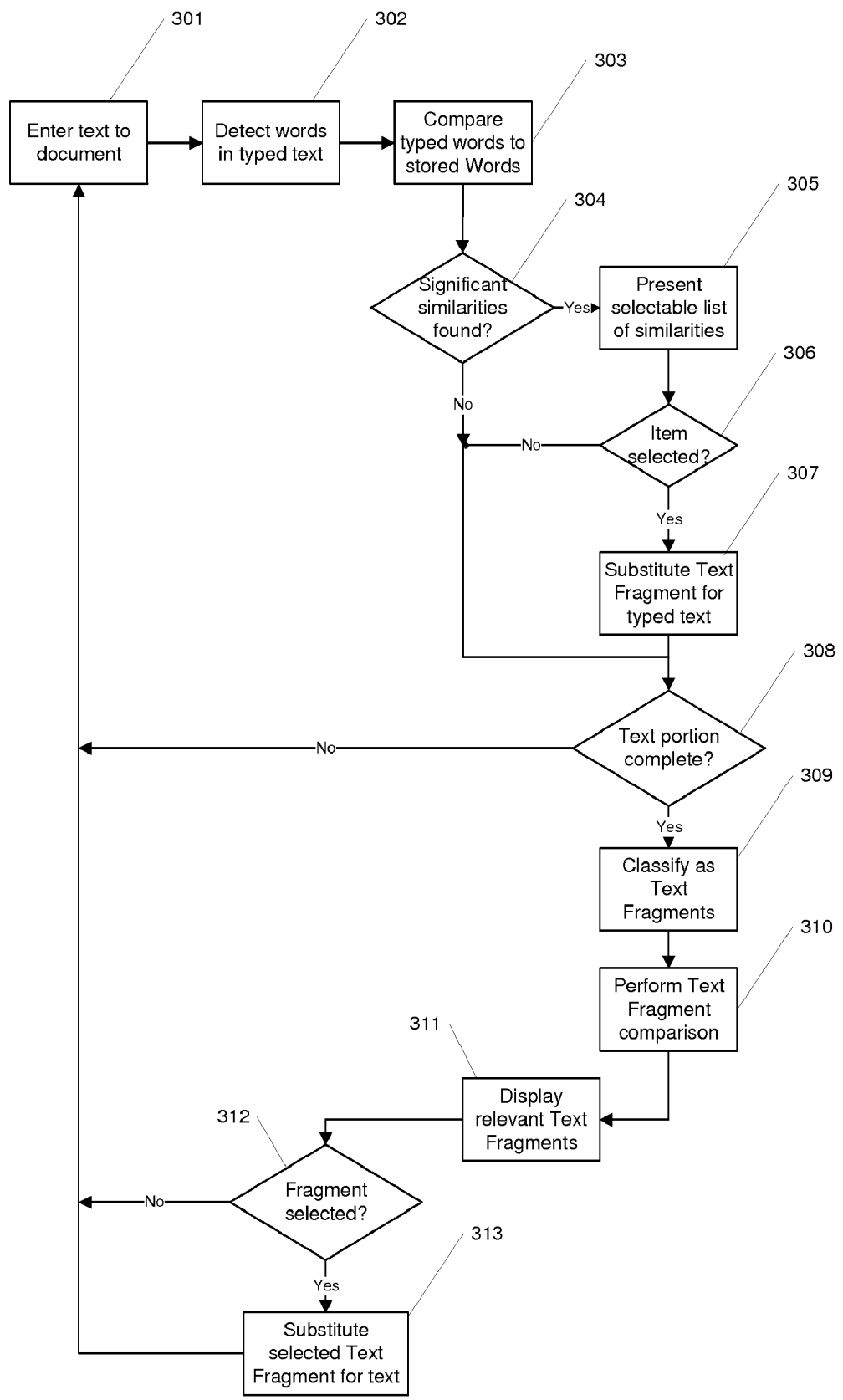
FIG. 3 is a flow diagram of the text comparison process of the invention.

FIG. 3 shows a preferred process followed in detecting and presenting stored Text Fragments in which at 301 a user types text into the document. At 302 words in the text are recognized as entities and compared to words existing in the Words table at 303. Where a distinctive word or several distinctive words are found in the Words table as associated with a particular Text Fragment it is considered that the similarities are significant as at 304 and at 305 the user is presented with the most significant of the similar Text Fragments found. The user may or may not select one of these at 305. Where one is selected it is substituted for the text being typed at 307.

Having completed a first comparison as the text is entered the system considers whether the text portion is complete at 308. Typically this will occur when the document is saved or when a timed autosave occurs, and at this point the entered text is classified at 309 as Text Fragments and analysed into the Words, InLine Tagging, etc. required for storage. Once classified a comparison with existing stored Text Fragments is made on an edit distance basis at 310 and any relevant hits are displayed at 311. A user may select a particular fragment at 312 to replace the fragment in question at 313, normally on the basis that the chosen fragment adheres more closely to company guidelines or better expresses the subject.

Typing more information into the document can then continue. The proposed system thus may not provide a full comparison and display of all possible options as the text is typed but can offer obvious options during typing and greater options as each paragraph is completed and indexed fully, or the later comparison can be performed after all typing is complete and the document saved, but before the final storage of the document.

While the process described uses different criteria for presenting substitute text before and after storage it would be desirable to use the same edit distance process for both, however it is not currently feasible to index text fragments in real time while a user types text in. Future improvements in processing speed should provide this as a viable option.

Visual Re-use Indication

In order to provide visual feedback of existing and potential re-use opportunities the topic text (and other fields) should use background highlighting (or similar). The purpose is to highlight paragraphs with different colors indicating the degree of similarity the paragraphs have to others in the database.

There preferably is one color to indicate 100% re-use, and other colors to indicate bands of similarity, which are user definable. For example the user could define that 100% is grey, a band of 100-95% would be green; 90-95% would be yellow, etc. The color would reflect the most similar match found, using the Similarity Matrix (above).

Visual Comparison

Once a user has determined, through the Visual Re-use Indication that a re-use opportunity exists they may display a list of similar paragraphs which would include as much information as possible to assist in making the best choice for re-use. Information such as:

the paragraph text.

number of times re-used contexts of re-use. Paragraphs used in content types similar or the same as the current will be more relevant.

highest state it is re-used in. A paragraph that is used in a "Released" state in more valuable than one in a "Draft" state.

number of languages it is translated into. Pre-translated content will be more valuable.

This information is preferably presented in a tabular form, perhaps using colors, font attributes, icons, etc to indicate certain information.

When a user selects any of the paragraphs presented, a visual comparison of the actual text differences should be displayed in a way which indicates the deleted/inserted words required to make the paragraphs match.

Variations

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the text management software may vary dependent on the particular application for which it is used without variation in the spirit and scope of the present invention.

In addition, although the preferred embodiments described herein are directed to text management software for use in document creation and retrieval it will be appreciated by those skilled in the art that the teachings of the present invention can be applied to other systems such as translation management software, without departing from the scope and spirit of the present invention.

Industrial Applicability

The text management software of the invention is used in the creation of documents and in text retrieval. It has widespread application and functionality for both organizations and individual authors. The present invention is therefore industrially applicable.

The invention claimed is:

1. A method of substituting alternative text in an electronic input of an author's work to a text management system, comprising:

storing text fragments of previous text;

indexing the stored text fragments on at least two different bases;

allowing the author to enter text;

comparing text fragments in the entered text to the stored text fragments, where one of the text fragments in the entered text is substantially similar on one of the at least two different bases to one of the stored text fragments;

displaying to the author a substitute text fragment for the one text fragment in the entered text; and providing the author with the option of substituting the substitute text fragment for the one text fragment of the entered text, wherein a first one of the at least two different bases is solely an edit distance basis and a second one of the at least two different bases combines a word occurrence algorithm, a word difference algorithm, and an edit distance algorithm, and the two bases contribute differently to a final similarity basis.

2. The method of substituting alternative text as claimed in claim 1, wherein when storing text fragments of previous text, any in-line text attributes in a text fragment are separated before determining if a similar text fragment already exists in text storage.

3. The method of substituting alternative text as claimed in claim 1, wherein when storing text fragments of previous text, related words are resolvable to a single normalized word form.

4. The method of substituting alternative text as claimed in claim 1, wherein the text fragments of previous text are stored in a database capable of storing paragraph size text fragments as separate records, each identical text fragment being represented as a single record.

5. The method of substituting alternative text as claimed in claim 1, wherein a single text fragment has multiple differing equivalents and a document is recreated in alternative differing forms from the differing equivalents.

6. The method of substituting alternative text as claimed in claim 5, wherein the document is recreated in a different language.

7. The method of substituting alternative text as claimed in claim 1, wherein differences in in-line tagging are stored as a separate layer linked to a context of re-use.

8. A text substitution apparatus comprising:
a store storing text fragments;
a viewer presenting text fragments appearing in an electronic document;
a comparer comparing the presented text fragments with the stored text fragments;
choice means for offering the stored text fragments to an apparatus user, where the presented text fragments differ from the stored text fragments by less than a definable quantity; and
substitution means for substituting one of the stored text fragments for one of the presented text fragments when chosen by the apparatus user,
wherein the choice means presents the stored text fragments in order of similarity to the presented text fragments and wherein the order of similarity is indicated by presentation color.

9. The text substitution apparatus as claimed in claim 8, wherein the definable quantity is defined by the edit distance of the text fragments.

10. The text substitution apparatus as claimed in claim 9, wherein the definable quantity is presented as a percentage of similarity in terms of edit distance of the presented text fragments to the stored text fragments.

11. The text substitution apparatus as claimed in claim 8, wherein the definable quantity is presented as a percentage of similarity in terms of relevance of the presented text fragments to the stored text fragments.

12. A method of comparing and substituting text at text entry to a document comprising:
providing a store of text fragments each of one or more words;
entering text to the document;
comparing text fragments in the entered text to the stored text fragments;
presenting to the text enterer a list of those stored text fragments closely approximating the entered text fragments for immediate substitution with an entered text fragment;
preparing an amended text for storage by resolving each entered text fragment to a normalized form; and
comparing the normalized text fragments to the stored text fragments and presenting a list of those stored text fragments approximating the normalized text fragments for substitution prior to storage,
wherein the stored text fragments are presented in order of similarity to the entered text fragments and wherein the order of similarity is indicated by presentation color.

13. A text substitution apparatus comprising:
a store storing text fragments;
an indexer indexing the stored text fragments on a least two different bases, wherein a first one of the at least two different bases is solely an edit distance basis and a second one of the at least two different bases combines a word occurrence algorithm, a word difference algorithm, and an edit distance algorithm;
a viewer presenting text fragments appearing in an electronic document;
a comparer comparing the presented text fragments with the stored text fragments;
choice means for offering the stored text fragments to an apparatus user, where the presented text fragments differ from the stored text fragments by less than a definable quantity on the basis of a combination of the at least two different bases; and
substitution means for substituting one of the stored text fragments for one of the presented text fragments when chosen by the apparatus user,
wherein the choice means presents the stored text fragments in order of similarity to the presented text.

\* \* \* \* \*